United States Patent Office 3,269,461
Patented August 30, 1966

3,269,461
SAND CONTROL IN A WELL
Lloyd K. Strange, Grand Prairie, and David S. Koons, Dallas, Tex., assignors to Mobil Oil Corporation, a corporation of New York
No Drawing. Filed Sept. 18, 1963, Ser. No. 309,893
10 Claims. (Cl. 166—33)

This invention relates to the treatment of subterranean formations and relates more particularly to the treatment of a subterranean formation penetrated by a well to control movement of solid material from the formation into the well.

In the production of fluids from a subterranean formation into a well, finely divided solid material often accompanies the fluid as it flows into the well from the formation. The solid material is solid earth material and includes what is often termed "float" or "flour" sand. Occasionally, a portion of the solid material will settle out in the well from the fluid with the result that the rate of production from the formation may be reduced. In aggravated cases, sufficiently large cavities may form in the formation around the well as a result of the movement of the solid material from the formation into the well to cause the liner of the well to shift. Frequently, such shifting of the liner will result in loss of the well. Solid material which does not settle out in the well tends to settle out in tanks or other equipment located at the surface of the earth which necessitates frequent cleaning of the tanks and other equipment, thereby increasing the cost of producing the liquid. Additionally, the solid material flowing with the fluid plugs up screens, slotted liners, and other equipment usually employed in the well in an effort to reduce the quantity of solid material entering the well with the fluid. Further, the solid material flowing with the fluid causes excessive erosion of well equipment.

It is an object of this invention to treat a subterranean formation. It is another object of this invention to provide a method for reducing the amount of solid material entering a well from a subterranean formation producing a fluid. It is another object of this invention to reduce the cost of producing fluids from a subterranean formation. It is another object of this invention to reduce erosion of well equipment. It is another object of this invention to consolidate the earth material of a subterranean formation in the vicinity of a well penetrating the formation. It is another object of this invention to reduce movement of sand into a well. These and other objects of the invention will become apparent from the following detailed description.

In accordance with the invention, there is provided a procedure wherein an unsaturated fatty acid material is placed in a subterranean formation adjacent to a well penetrating the formation, thereafter an oxygen-containing gas is passed into the formation through said well to effect oxidation of the unsaturated fatty acid material, and the oxidation reaction is controlled so as to prevent the attainment of a temperature sufficiently high to effect ignition and combustion of the unsaturated fatty acid material.

By the term "unsaturated fatty acid material," we mean to include the unsaturated fatty acid per se, its salts, its esters, and mixtures thereof. The salts include the alkali metal and the alkaline earth metal salts. The esters include the ethyl ester.

By the procedure of the invention, the portion of the subterranean formation in the vicinity of the well and containing the unsaturated fatty acid material is provided with a body of oxidized fatty acid material which consolidates the earth material of the formation. The oxygen in the oxygen-containing gas is absorbed by the unsaturated fatty acid to form first a gummy binder for the earth material. Thereafter, with further absorption of oxygen, the unsaturated fatty acid material resinifies to form with the earth material a hard, dry, insoluble but permeable pack or zone about the well. The consolidated, permeable zone is resistant to disintegration and is an effective filter for removing finely divided solid material accompanying the liquid flowing from the formation into the well. Further, the filtering action of the consolidated, permeable zone does not appreciably reduce the rate of flow of liquid from the formation into the well.

In the practice of the invention, any unsaturated fatty acid material may be employed. It is preferred, however, to employ, as the unsaturated fatty acid material, an oil which contains oleic, linoleic, or linolenic acid. In a particularly preferred embodiment of the invention, an oil is employed which contains each of these three latter acids. In a specific embodiment of the invention, the oil placed within the formation is linseed oil.

Linseed oil is obtained from the flax plant, *Linum usitatissium*. It contains oleic, linoleic, and linolenic acid in various proportions, depending upon the source of the plant. The constituent fatty acids of linseed oil consist approximately of one-half linolenic and one-fifth each of linoleic and oleic acids. The oil also contains smaller amounts of other, mainly saturated, acids. More specifically, linseed oil may contain between about 13 to 29 percent of oleic acid, about 15 to 31 percent of linoleic acid, about 44 to 45 percent of linolenic acid, and about 6 to 15 percent of saturated acids.

Other oils containing oleic, linoleic, or linolenic acid may also be employed. For example, candlenut, conophor, herring, Niger seed, oiticica, perilla, poppy seed, rubber seed, safflower, soya bean, stillingia, sunflower, tobacco seed, tung, dehydrated castor, and walnut oil may be employed.

In the practice of the invention, the unsaturated fatty acid material is injected from the well into the formation which is to be treated. For example, the unsaturated fatty acid material can be pumped through tubing to the formation to be treated and by pressure imposed upon the unsaturated fatty acid, the unsaturated fatty acid material is placed in the formation. The unsaturated fatty acid material may be dissolved in a solvent prior to being placed in the formation, if desired or necessary.

If desired, the formation, or portion thereof, to be treated can be isolated prior to introduction of the unsaturated fatty acid material. By isolating the formation, or portion thereof, to be treated, wastage is avoided by insuring that all of the unsaturated fatty acid material employed enters the formation. Isolation can be effected, for example, by employing straddle packers, i.e., a packer below the formation and a packer above the formation, or portion thereof, and forcing the unsaturated fatty acid material through tubing or otherwise between the packers. Where the formation, or portion thereof, to be treated is at the bottom of a well borehole, a single packer may be employed above the formation, or portion thereof, to be treated and the unsaturated fatty acid material introduced into the formation below the packer. "Floating" of the unsaturated fatty acid material can also be employed. In this technique, the well is filled with a liquid to the level of the formation, or portion thereof, to be treated. A packer is placed in the well just above the point of treatment and the unsaturated fatty acid material is forced into the well below the packer. The liquid, of course, which is used to fill the well for the floating technique is more dense than the unsaturated fatty acid material. The unsaturated fatty acid material floats at the top of the body of liquid in the well and enters the formation adjacent to the top of the body of liquid. "Submarining" of the unsaturated fatty acid material can also be employed. In this technique, a body of liquid is formed within the well with the formation, or portion thereof, to be treated at the bottom of the body of liquid. In this technique, the liquid which is used to fill the well as less dense than the unsaturated fatty acid material. The unsaturated fatty acid material sinks to the bottom of the body of liquid and upon imposition of pressure will enter the formation adjacent to the bottom of the body of liquid. Another technique which may be employed to introduce the unsaturated fatty acid material into the formation is the so-called "Bradenhead" squeeze.

Desirably, prior to introduction of the unsaturated fatty acid material, the well, and the adjacent formation, may be cleaned to remove any undesirable material, such as drilling fluid, which may be within the well and the formation. For this purpose, a suitable fluid such as water, or oil, which may be diesel oil, lease crude, or other type of mineral oil, may be employed.

The amount of unsaturated fatty acid material employed may be as desired. Effective consolidation of the formation will occur over that portion thereof containing the unsaturated fatty acid material. However, from the standpoint of providing sufficient structural strength to the consolidated zone, the unsaturated fatty acid material should be employed in an amount to fill the formation from the wall of the well to a distance therefrom of at least one foot. Preferably, the amount employed should be employed to fill the formation from the wall of the well to a distance therefrom of at least two feet. Greater amounts, of course, can be employed.

Subsequent to placing the unsaturated fatty acid material into the formation, an oxygen-containing gas is passed into the formation from the well borehole to contact the unsaturated fatty acid material. For this purpose, any oxygen-containing gas may be employed. Preferably, however, air is employed. On the other hand, pure oxygen or diluted oxygen may be employed, or air containing a diluent such as carbon dioxide or additional nitrogen may also be employed.

Prior to passing the oxygen-containing gas into the formation and subsequent to placing the unsaturated fatty acid material into the formation, the tubing or other means employed for passing gas and the unsaturated fatty acid material may be cleaned to remove unsaturated fatty acid material. By this procedure, resinification of the unsaturated fatty acid material in the tubing or other means with consequent possibility of plugging is avoided. For cleaning, an inert fluid, such as nitrogen, can be passed through the tubing to remove the unsaturated fatty acid material.

It is essential that combustion of the unsaturated fatty acid material in the formation during passage of the oxygen-containing gas be avoided. With combustion, the unsaturated fatty acid material is completely burned and the formation remains in its original unconsolidated state. Thus, passage of the oxygen-containing gas into the formation from the well is controlled so as to effect a low temperature oxidation, or resinification, of the unsaturated fatty acid material.

To effect resinification of the unsaturated fatty acid material, and avoid combustion thereof, any desired procedure may be employed. For example, a temperature measuring device, such as a thermocouple, may be positioned in the well adjacent to the formation containing the unsaturated fatty acid and the rate and amount of the oxygen-containing gas passed into the formation is controlled to prevent attainment of the ignition temperature of the unsaturated fatty acid material. Knowledge of the ignition temperature of the unsaturated fatty acid material may be obtained from the published literature or, more preferably, experimentally determined for the particular unsaturated fatty acid material employed. Attainment of a temperature sufficiently high to effect a combustion of the unsaturated fatty acid material may be avoided, utilizing previous knowledge of the amount and rate of flow of oxygen-containing gas required to attain the ignition temperature. For example, it can be determined, employing a given amount of the unsaturated fatty acid material deposited on a porous medium similar to the earth material of the formation, the amount and rate of supply of oxygen-containing gas required to attain ignition temperature. Thereafter, the rate and amount of oxygen-containing gas passed into the formation would be maintained below the amount thus ascertained. Alternatively, the oxygen-containing gas may be passed into the formation at a rate equal to or greater than that which will eventually effect combustion and the passage of the oxygen-containing gas would be terminated before the combustion temperature would be reached.

Further, with respect to avoiding ignition of the unsaturated fatty acid material within the formation, temperature control of the oxygen-containing gas passed into the formation may be effected. Thus, where, from knowledge of the temperature within the formation, employing temperature measuring means or knowing the rate and amount of oxygen-containing gas required per unit amount of unsaturated fatty acid material to attain ignition temperature, the oxygen-containing gas entering the formation may be cooled to avoid attainment of the ignition temperature. For this purpose, a suitable heat exchanger may be employed at the surface of the earth or within the well.

Resinification of the unsaturated fatty acid material may be accelerated by various means. For example, heating of the oxygen-containing gas may be effected where the conditions within the formation and of the injection of the oxygen-containing gas are such that absorption of the oxygen is slow. For heating of the oxygen-containing gas, a suitable heat exchanger located at the surface of the earth or within the well may be employed. Other means for accelerating resinification involve addition of various catalytic materials to the unsaturated fatty acid material. Thus, for example, cobalt naphthenate or manganese naphthenate may be added to the unsaturated fatty acid material.

The following examples will be further illustrative of the invention.

*Example 1*

In this example, sand packs were prepared. These packs were prepared by pouring sand into a cylinder formed of an impermeable material. Each cylinder was 4 inches in length and 2 inches in diameter. Following preparation of the sand packs, the permeability of each was determined by passing air through the packs at a known pressure differential and measuring the rate of flow of the air.

Linseed oil was then poured into each of the sand packs to saturate the pack with the linseed oil. For consolidation, the complete apparatus was heated to a specified temperature. The temperature in the center of the packs was measured with a thermocouple. Air was passed through the pack when it reached the desired temperature. Passage of the air was continued until the linseed oil in each of the sand packs had attained complete resinification effecting consolidation of the packs. The permeability of each of the consolidated sand packs was then determined by measuring the rate of flow of the air and the pressure differential. There was no appreciable change in the permeability from that previously measured.

Cores of the consolidated sand packs were then removed from the impermeable cylinders. Thereafter, each of the cores was tested for set strength by the method of compressive destruction. The following table gives the results attained.

TABLE I

| Core No. | Temperature of Consolidation, °F. | Strength, pounds per square inch |
|---|---|---|
| 1 | 300 | 620 |
| 2 | 450 | 1,050 |
| 3 | 550 | 2,350 |
| 4 | 600 | 2,860 |

*Example 2*

In this example, a producing well was treated by the procedure of the invention.

A well penetrating a petroleum-producing formation was producing 61 barrels per day of petroleum. The well was provided with a casing and production was from the formation through perforations in the casing. The wellhead pressure varied from 500 to 700 pounds per square inch gauge, depending upon the size of the choke. The well had been producing sand for a period of approximately five years.

For treatment of the formation, production from the well was discontinued. Sand in the casing was washed out with water. At the end of the washing, the casing remained full of water. The tubing still contained lease crude. Next, approximately 480 gallons of linseed oil were pumped downwardly through the tubing and into the formation in a period of 12 minutes and at a pressure of 1200 pounds per square inch gauge. Thereafter, nitrogen was injected into the tubing following the linseed oil in order to provide a nonreactive fluid between the oxygen-containing gas and the linseed oil. The linseed oil thus passed downwardly through the tubing, floated atop the water and entered into the producing formation through the perforations in the casing. Air was injected into the tubing immediately after the nitrogen and into the formation through the perforations in the casing at a rate of approximately 800 standard cubic feet per hour. Injection of air was thus continued for 80 hours. Pressures of injection varied between 1960 and 2210 pounds per square inch gauge and the maximum temperature attained by the linseed oil in the formation was of the order of 354° F. as determined by a thermometer in the well adjacent to the formation.

Following termination of the injection of the air, the well was placed back on production. Flow of petroleum from the well was started through a 3/32-inch choke. Production of petroleum for the first 15 hours was at the rate of 37 barrels per day. Three days thereafter, the well produced at the rate of 61 barrels per day and maintained this rate thereafter. Subsequent to placing the well back on production, there was no evidence of sand being produced.

Having thus described our invention, it will be understood that such description has been given by way of illustration and example and not by way of limitation, reference for the latter purpose being had to the appended claims.

We claim:
1. In a process of treating a well productive of solid material from a formation along with fluid into said well, the steps comprising:
   (a) placing an unsaturated fatty acid material in said formation adjacent to said well,
   (b) thereafter passing into said formation through said well an oxygen-containing gas to contact and to effect resinification of said unsaturated fatty acid material in said formation, and
   (c) maintaining conditions of passage into said formation of said oxygen-containing gas such that the temperature within said formation does not exceed the ignition point of said unsaturated fatty acid material.
2. The procedure of claim 1 wherein said unsaturated fatty acid material is an unsaturated fatty acid.
3. The procedure of claim 2 wherein said unsaturated fatty acid is selected from the group consisting of oleic, linoleic, and linolenic acids.
4. The procedure of claim 1 wherein said unsaturated fatty acid material is an oil containing oleic, linoleic, and linolenic acids.
5. The procedure of claim 1 wherein said unsaturated fatty acid material is linseed oil.
6. The procedure of claim 1 wherein said unsaturated fatty acid material is employed in an amount sufficient to fill said formation for a distance of at least one foot from the wall of said well.
7. The procedure of claim 1 wherein said unsaturated fatty acid material is employed in an amount sufficient to fill said formation for a distance of two feet from the wall of said well.
8. The process of claim 1 wherein said oxygen-containing gas is air.
9. The process of claim 1 wherein said oxygen-containing gas is cooled prior to entry into said formation.
10. The process of claim 1 wherein said oxygen-containing gas is heated prior to entry into said formation to accelerate resinification of said unsaturated fatty acid material.

References Cited by the Examiner

UNITED STATES PATENTS 2,079,431   5/1937   Cannon _____ 166—32
3,004,599   10/1961  Goodwin et al. _____ 166—38

OTHER REFERENCES

Markley, K. S., Fatty Acids, Their Chemistry, Properties, Production, and Uses, Second Edition, Part 2, New York, Interscience Publishers, Inc., 1961, pp. 1403, 1405, 1406, 1408, 1409, 1425, 1426.

CHARLES E. O'CONNELL, *Primary Examiner.*

T. A. ZALENSKI, *Assistant Examiner.*